Feb. 25, 1964        A. SPLENDORE        3,122,077
MULTIPLE EXPOSURE ATTACHMENT FOR CAMERA
Filed Feb. 13, 1962        2 Sheets-Sheet 1

INVENTOR.
ANGELO SPLENDORE
BY Leonard H. King
ATTORNEY.

INVENTOR.
ANGELO SPLENDORE
ATTORNEY.

United States Patent Office 3,122,077
Patented Feb. 25, 1964

3,122,077
MULTIPLE EXPOSURE ATTACHMENT FOR CAMERA
Angelo Splendore, 92 Lord Ave., Inwood, N.Y.
Filed Feb. 13, 1962, Ser. No. 172,904
3 Claims. (Cl. 95—36)

This invention relates to lens attachments for obtaining multiple exposures upon a single film surface by selective successive exposures of different sections of this film surface, to provide the effect of photomontage. More particularly, the present invention provides novel means for heightening the illusion of simultaneous exposure of the film as a single photograph by eliminating to a great extent those traces of overlap which would reveal multiple exposure.

The use of multiple exposure of a single film can serve the practical purpose of conserving film, as in cases where a plurality of separate images is placed upon the film for development. In this case, it is clear that separate pictures are desired and the definite demarcation in the boundary between adjacent sections on the single film becomes desirable. However, it is well known that the more common application of multiple exposure is for photographic novelty and entertainment, where the skill of the photographer is shown by providing the illusion of simultaneity. In such case it becomes particularly important to avoid any trace of demarcation between the separate sections of the film which were naturally exposed at different time intervals. Thus, it is essential in such a device to provide means for blending and overlapping the exposures, whereby the marginal edges of each exposure are not clear cut but are blended into the adjacent exposures. It will be appreciated that this is difficult to achieve in practice since devices which provide a movable aperture arrangement to uncover different sections of the lens are in themselves miniature displaceable camera apertures, and as such are generally characterized by a sharp outline. Thus, light passing through this displaceable aperture will be given a sharp "frame," rather than the blurred outline that is essential for proper overlap.

A proposed solution to this problem has been the use of a curtain arrangement whereby movable curtain members are adjusted to provide an exposure opening of sufficient size to expose only the desired portion of the film positioned in the camera. As the curtains on the lens hood are adjacent to the camera lens, the marginal edges of each exposure are not clear cut but are blended into the adjacent exposures. Thus, it will be appreciated that the goal envisaged by this device is to assure that the marginal edge of each exposure be blurred rather than sharply defined. It will be appreciated that such a device is complex and requires a multiplicity of movable parts. However, the device of the present invention proposes to achieve this marginal blurring by novel means while providing an inexpensive and extremely simple molded structure which can be operated by camera users having little or no experience in multiple exposure photography.

It is proposed to provide a movable aperture having novel light dispersion means about the edge portion of a displaceable aperture, which will provide a penumbral effect and thus cause blending and overlapping exposures. This gives a high degree of illusion to such photographs, even when made by members of the public with little or no experience in photography. It will be appreciated that this will greatly add to the utility of the device and lead to general acceptance by many people who would not wish to buy a complex and expensive device yielding a similar result.

It is therefore a primary object of the present invention to provide means for making multiple exposures on a single film with a high degree of illusion of simultaneity.

It is a further object of the present invention to provide a simple low cost device, readily employable by amateur photographers with no previous experience in taking pictures of this type.

It is yet a further object of the present invention to provide improved means for making multiple exposures on a single film, wherein each exposure covers an equal fractional area of the total surface of the single sheet of photographic film.

Still a further object of the present invention is to provide means for adjusting the area of exposure to preselected fractions of the total surface of the film, varying these proportions as desired.

These and further objects and advantages of the present invention will be apparent or will be pointed out with particularity from the following description in the drawing, in which.

Figure 1:
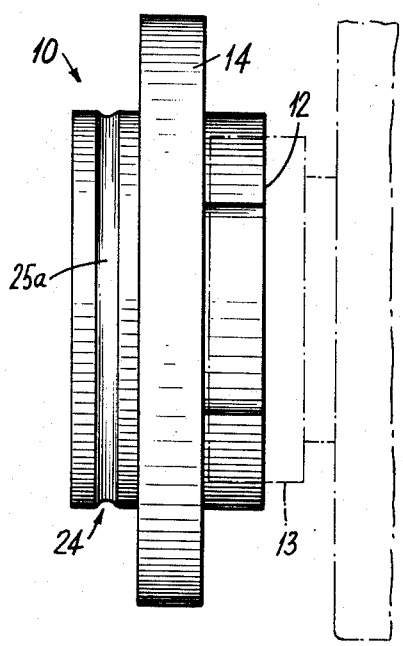
FIG. 1 is a side view of the sleeve member of the present invention.
Figure 2:
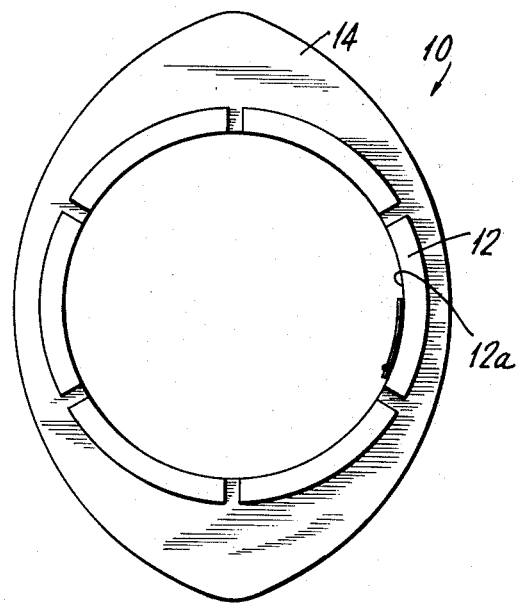
FIG. 2 is an end view of FIG. 1 taken from the right side.
Figure 3:
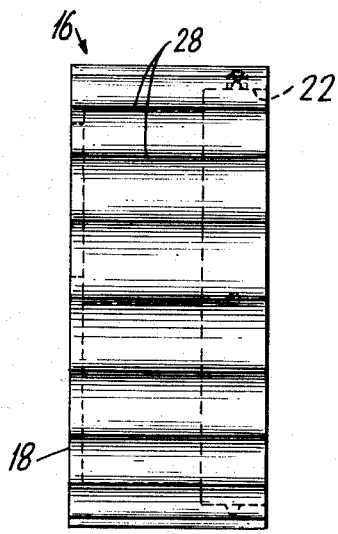
FIG. 3 is a side view of the hood member of the present invention.

Referring now to the drawing, there is shown in FIG. 1 a sleeve member 10 adapted to be frictionally engaged to the lens barrel 13 of a camera by means of slotted sleeve portion 12 which is slightly deformable under pressure, hence grips the lens barrel in the assembled condition. Sleeve member 10 is preferably formed of molded plastic material as a unitary structure, hence will be rather inexpensive to produce in quantity. It is anticipated that the inner diameter 12a of sleeve 10 (FIG. 2) will be such as to register with standard makes of cameras now in use, with sleeve units being provided to fit over the various makes for which it is anticipated that a public demand will exist. Sleeve 10 is of hollow construction whereby the camera lens is not obstructed, and is provided with radially extending flange portions 14 for use in the present invention, as explained hereinbelow. The non-circular shape of flange 14 aids the user to grasp the device.

Figure 4:
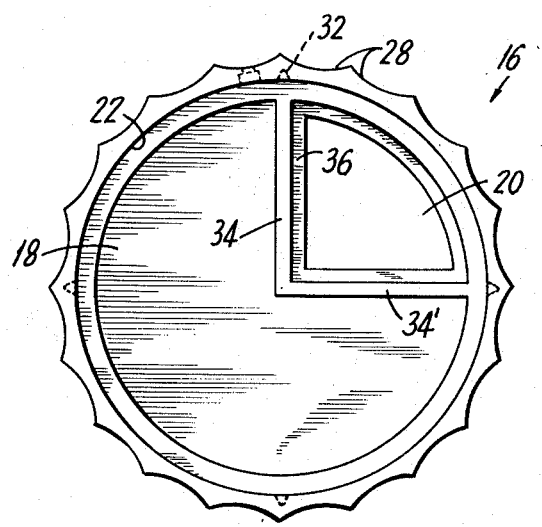
FIG. 4 is an end view of the hood member of FIG. 3 taken from the right side.
Figure 8:
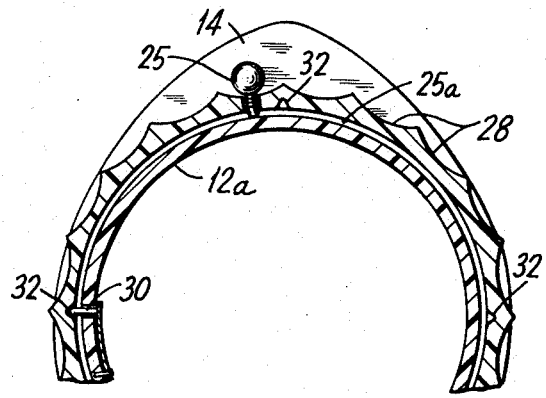
FIG. 8 is a partial cross-section of FIG. 7 taken along line 8—8.

Hood member 16 is a generally cylindrical member provided with a transverse wall portion 18 formed at one end thereof, in which is formed aperture 20. Bore 22 of hood member 16 is of a diameter adapted to register in close frictional relation with grooved end portion 24 of member 10 in the assembled condition. A spring loaded detent 25 (FIG. 8) may conveniently be employed to retain the sleeve member 10 to the hood member 16. Detent 25 rides in groove 25a (FIG. 1). Hood member 16 is concentric with and rotatable about sleeve member 10, such displacement being accomplished by means of flange member 26 which may be grasped by one hand, and by scalloped portions 28 of hood member 16, which may be grasped by the other hand whereby aperture 20 may be circumferentially displaced. As is well known, the process of multiple exposure involves having a single film frame exposed a number of times with the lens aperture shifted each time, so that the illusion of simultaneity of exposure is achieved in the developed film. It will therefore be appreciated that aperture 20 should be an integral fraction of the lens surface, hence of the film surface, such as one-half, one-third, etc. For purposes of illustration, a one-quarter aperture is shown in FIGS. 4 and 5.

Figure 7:
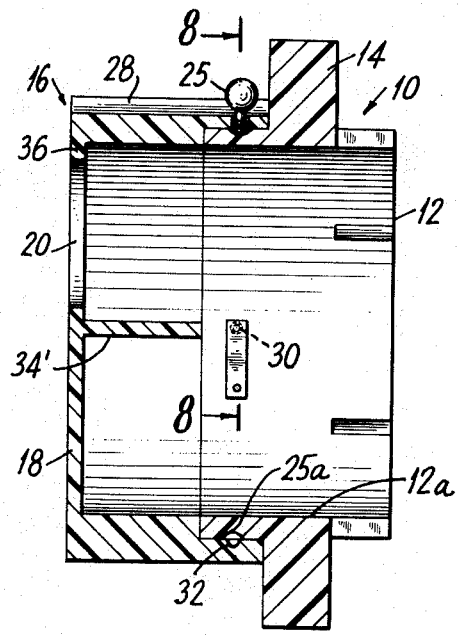
FIG. 7 is a side view in cross-section of the device of the present invention in the assembled condition.

Thus, rotation of the hood member will successively position the aperture in front of the diaphragm and lens of the camera (not shown) at the preselected position for the desired exposure. While this can generally be done by rough approximation, such as giving the hood member one-quarter turn for each position, it is envisaged in the present invention to provide detent means 30, FIG. 7, whereby the photographer can readily sense the amount of turn by the snap of the hood member into position. For such use, the present invention provides spring loaded detent 30 and registering indentations 32, the number of such indentations corresponding to the central angle of the aperture.

Figure 5:
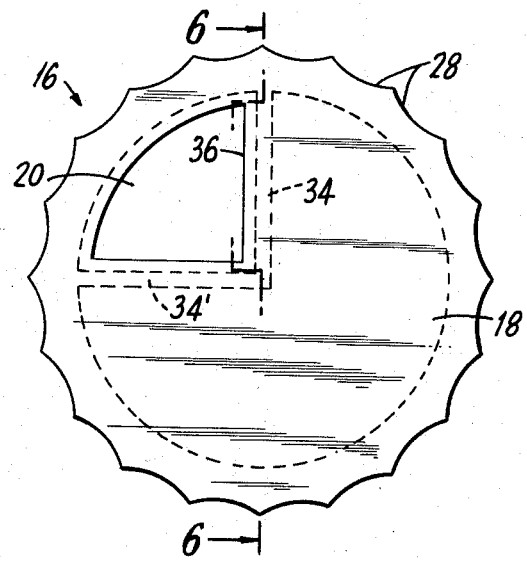
FIG. 5 is an end view of the hood member of FIG. 3 taken from the left side.
Figure 6:
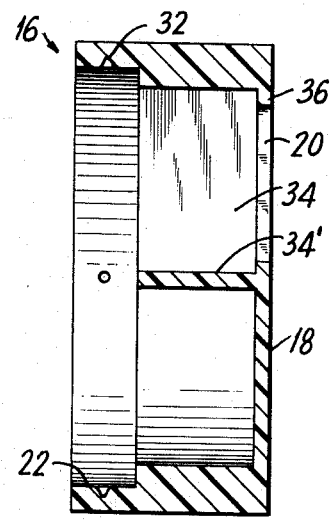
FIG. 6 is a cross-section of FIG. 5 taken along line 6—6.

As shown in FIG. 5, hood member 16 is provided with an arrangement of baffles whereby radially deployed baffle members 34—34' are formed on the inner surface of transverse member 18 and extend from the center of this surface to the inner wall 22 of the hood member. Baffles 34—34' are relatively thin ridge structures in cross-section, deployed on either side of the aperture, as indicated in FIG. 4. A relatively narrow ledge portion 36 defines the boundary of the aperture, and extends parallel to the baffle members 34—34' and also to the inner wall portion of the hood member, as shown in FIGS. 4 and 5. The dimensions of the ledge and baffle members taken in conjunction with the sides of the aperture are such that light entering the aperture will be subject to the phenomenon of diffraction, whereby the ledge in conjunction with the baffle causes the diffusion of light along the boundary portion creating the blurred outline essential to the purpose of the present invention, that is, there is blending and overlap of adjacent areas of the film frame as the aperture is rotated. There is thus created a multiple exposure photograph with a high degree of illusion of simultaneity; jagged sharp displacement of adjoining position, as in conventional multi-exposure devices, is thus avoided. It has been found that the height of the baffle should be two or three times the width of the ledge. Thus where the ledge is one-sixteenth of an inch, approximately, the baffle will be one-eighth of an inch in height. These dimensions and the juxtaposition of the baffle and the ledge provide the necessary light diffraction.

It will be understood that the opening 20 is spaced far enough from the camera lens so that it does not merely act as a diaphragm.

There has been disclosed heretofore the best embodiment of the invention presently contemplated and it is to be understood that various changes and modifications may be made by those skilled in the art without departing from the spirit of the invention.

What is claimed is:

1. A multiple exposure attachment for a camera comprising:
    (a) an open ended tubular sleeve member having a plurality of fingers extending from one end for securing the sleeve to the lens barrel of the camera; and
    (b) a hood member comprising:
        (1) a hollow cylindrical member coaxially aligned with and frictionally engaging said sleeve member for rotation thereabout;
        (2) a transverse wall extending across the interior of said hollow cylindrical member, said transverse wall having an aperture formed therein;
        (3) finger grips formed in the outer surface of said cylindrical wall portion whereby said hood member can be digitally manipulated to radially displace it relative to said sleeve member at selectable angles of rotation to thereby expose corresponding portions of photographic film positioned in said camera; and
        (4) a baffle wall extending perpendicularly from said transverse wall along said aperture to provide a penumbral blending effect proximate contiguous portions of the film successively exposed by the displacement of said aperture.

2. The device of claim 1 wherein detent means are provided for releasable locking the said hood relative to said sleeve in preselected fractions of a circle, said fractions ranging from one-sixth to one-half.

3. The device of claim 2 wherein the detent means is comprised of a spring-loaded detent member adapted to register with a selected one of a plurality of spaced grooves defining said preselected fractions.

References Cited in the file of this patent

UNITED STATES PATENTS

| | | |
|---|---|---|
| 1,056,588 | Rusk | Mar. 18, 1913 |
| 2,437,159 | Herbert | Mar. 2, 1948 |